(12) United States Patent
Alkan et al.

(10) Patent No.: US 12,398,269 B2
(45) Date of Patent: Aug. 26, 2025

(54) METHOD OF MANUFACTURING A MOLD THAT IS RESISTANT TO HYPOCHLORITE

(71) Applicant: EMS-CHEMIE AG, Domat/Ems (CH)

(72) Inventors: Arda Alkan, Domat/Ems (CH); Thomas Wiedemann, Domat/Ems (CH); Andri Cadalbert, Bonaduz (CH); Manfred Hewel, Domat/Ems (CH); Botho Hoffmann, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 38 days.

(21) Appl. No.: 17/129,507

(22) Filed: Dec. 21, 2020

(65) Prior Publication Data
US 2021/0189125 A1    Jun. 24, 2021

(30) Foreign Application Priority Data
Dec. 23, 2019 (EP) .................................. 19219338

(51) Int. Cl.
*C08L 77/08*     (2006.01)
*C08K 5/134*     (2006.01)
*C08K 7/14*      (2006.01)

(52) U.S. Cl.
CPC .............. *C08L 77/08* (2013.01); *C08K 5/134* (2013.01); *C08K 7/14* (2013.01); *C08L 2203/30* (2013.01)

(58) Field of Classification Search
CPC ..... C08L 77/08; C08L 2203/30; C08K 5/134; C08K 7/14; C08K 5/1345; C08G 69/265
See application file for complete search history.

(56) References Cited

U.S. PATENT DOCUMENTS

| | | | |
|---|---|---|---|
| 5,177,177 A * | 1/1993 | Thullen | C08G 69/34 528/346 |
| 5,177,178 A | 1/1993 | Thullen et al. | |
| 6,482,889 B1 | 11/2002 | Kurz | |
| 7,723,411 B2 | 5/2010 | Schneider | |
| 7,973,191 B2 | 7/2011 | Doring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stöppelmann et al. | |

(Continued)

FOREIGN PATENT DOCUMENTS

| EP | 0 469 435 A1 | 2/1992 |
|---|---|---|
| EP | 1 291 073 A1 | 3/2003 |

(Continued)

OTHER PUBLICATIONS

US 10,875,999 B2, 12/2020, Stöppelmann et al. (withdrawn)

(Continued)

*Primary Examiner* — Jiangtian Xu
(74) *Attorney, Agent, or Firm* — Leydig, Voit & Mayer, Ltd.

(57) ABSTRACT

The present invention relates to the use of a polyamide molding compound for application purposes in which a high resistance to hypochlorous acid is decisive. The molding compound is thus used in accordance with the invention for molds that are suitable for contact with aqueous solutions containing hypochlorous acid.

17 Claims, 4 Drawing Sheets

Copolyamide (A)

(56) References Cited

U.S. PATENT DOCUMENTS

| | | |
|---|---|---|
| 8,993,662 B2 | 3/2015 | Kaplan |
| 9,109,115 B2 | 8/2015 | Buhler et al. |
| 9,133,322 B2 | 9/2015 | Roth et al. |
| 9,359,532 B2 | 6/2016 | Kaplan |
| 9,453,106 B2 | 9/2016 | Buhler et al. |
| 9,644,081 B2 | 5/2017 | Aepli et al. |
| 9,663,655 B2 | 5/2017 | Aepli |
| 9,815,967 B2 | 11/2017 | Harder et al. |
| 9,963,547 B2 | 5/2018 | Hoppe et al. |
| 9,963,591 B2 | 5/2018 | Bayer et al. |
| 9,969,882 B2 | 5/2018 | Thomas et al. |
| 10,005,268 B2 | 6/2018 | Jeltsch et al. |
| 10,047,054 B2 | 8/2018 | Kaplan |
| 10,144,805 B2 | 12/2018 | Bayer et al. |
| 10,233,326 B2 | 3/2019 | Koch et al. |
| 10,544,286 B2 | 1/2020 | Nakano et al. |
| 10,577,478 B2 | 3/2020 | Fujii et al. |
| 10,683,418 B2 | 6/2020 | Thomas et al. |
| 10,717,816 B2 | 7/2020 | Aepli et al. |
| 10,751,961 B2 | 8/2020 | Cheung |
| 10,767,047 B2 | 9/2020 | Aepli et al. |
| 10,767,048 B2 | 9/2020 | Aepli et al. |
| 10,836,905 B2 | 11/2020 | Wiedemann et al. |
| 10,843,389 B2 | 11/2020 | Weis et al. |
| 10,882,975 B2 | 1/2021 | Stöppelmann |
| 10,889,713 B2 | 1/2021 | Schubert et al. |
| 10,899,527 B2 | 1/2021 | Sütterlin et al. |
| 10,927,254 B2 | 2/2021 | Stöppelmann et al. |
| 11,059,950 B2 | 7/2021 | Holzschuh et al. |
| 11,091,590 B2 | 8/2021 | Hoffmann et al. |
| 11,098,194 B2 | 8/2021 | Aepli et al. |
| 11,186,716 B2 | 11/2021 | Sütterlin et al. |
| 11,254,083 B2 | 2/2022 | Caviezel |
| 11,254,794 B2 | 2/2022 | Holzschuh et al. |
| 11,274,204 B2 | 3/2022 | Wiedemann |
| 11,359,051 B2 | 6/2022 | Aepli et al. |
| 11,359,091 B2 | 6/2022 | Wiedermann et al. |
| 11,453,778 B2 | 9/2022 | Harder et al. |
| 11,466,153 B2 | 10/2022 | Wiedermann et al. |
| 11,981,813 B2 | 5/2024 | Alkan et al. |
| 2006/0235190 A1 | 10/2006 | Hoffman et al. |
| 2006/0264542 A1 | 11/2006 | Schneider |
| 2008/0135720 A1 | 6/2008 | Bühler et al. |
| 2008/0300347 A1 | 12/2008 | Kurz et al. |
| 2010/0069657 A1 | 3/2010 | Doring et al. |
| 2010/0168423 A1 | 7/2010 | Doring et al. |
| 2010/0279111 A1 | 11/2010 | Harder et al. |
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0136911 A1 | 5/2013 | Bender et al. |
| 2013/0317168 A1 | 11/2013 | Buhler et al. |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Buhler et al. |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2017/0275459 A1* | 9/2017 | Hewel ................ C08K 7/14 |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251599 A1* | 9/2018 | Aepli ................ C08G 69/265 |
| 2018/0251600 A1 | 9/2018 | Hoffman et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Cavieze |
| 2021/0032464 A1 | 2/2021 | Stöppelmann |
| 2021/0032465 A1 | 2/2021 | Wiedemann et al. |
| 2021/0032466 A1 | 2/2021 | Stöppelmann |
| 2021/0040264 A1 | 2/2021 | Harder et al. |
| 2021/0040317 A1 | 2/2021 | Harder et al. |
| 2021/0115250 A1 | 4/2021 | Wiedemann et al. |
| 2021/0189124 A1 | 6/2021 | Alkan et al. |
| 2021/0189125 A1 | 6/2021 | Alkan et al. |
| 2022/0195186 A1 | 6/2022 | Alkan et al. |
| 2022/0204764 A1 | 6/2022 | Alkan et al. |
| 2023/0312922 A1 | 10/2023 | Aepli et al. |

FOREIGN PATENT DOCUMENTS

| | | |
|---|---|---|
| EP | 3 369 760 A1 | 9/2018 |
| EP | 3 369 761 A1 | 9/2018 |
| EP | 3 502 188 A1 | 6/2019 |
| JP | H04-233943 A | 8/1992 |
| JP | H04-253727 A | 9/1992 |
| JP | 2018-162445 A | 10/2018 |
| JP | 2018-168353 A | 11/2018 |
| JP | 2019-070110 A | 5/2019 |
| TW | 201839034 A | 11/2018 |

OTHER PUBLICATIONS

US 11,332,575 B2, 05/2022, Aepli et al. (withdrawn)
U.S. Appl. No. 09/533,280, filed Mar. 22, 2000, Never Issued: Abandoned/Expired.
U.S. Appl. No. 10/536,494, filed May 24, 2005, Patented.
U.S. Appl. No. 10/553,259, filed Oct. 11, 2005, Patented.
U.S. Appl. No. 11/950,964, filed Dec. 5, 2007, Patented.
U.S. Appl. No. 12/091,024, filed Apr. 21, 2008, Never Issued: Abandoned/Expired.
U.S. Appl. No. 12/539,972, filed Aug. 12, 2009, Never Issued: Abandoned/Expired.
U.S. Appl. No. 12/540,007, filed Aug. 12, 2009, Never Issued: Abandoned/Expired.
U.S. Appl. No. 12/743,097, filed May 14, 2010, Patented.
U.S. Appl. No. 13/045,682, filed Mar. 11, 2011, Patented.
U.S. Appl. No. 13/186,785, filed Jul. 20, 2011, Patented.
U.S. Appl. No. 13/290,718, filed Nov. 7, 2011, Patented.
U.S. Appl. No. 13/421,541, filed Mar. 15, 2012, Never Issued: Abandoned/Expired.
U.S. Appl. No. 13/481,451, filed May 25, 2012, Patented.
U.S. Appl. No. 13/674,395, filed Nov. 12, 2012, Never Issued: Abandoned/Expired.
U.S. Appl. No. 13/800,102, filed Mar. 13, 2013, Patented.
U.S. Appl. No. 13/898,099, filed May 20, 2013, Patented.
U.S. Appl. No. 13/971,376, filed Aug. 20, 2013, Patented.
U.S. Appl. No. 14/078,134, filed Nov. 12, 2013, Patented.
U.S. Appl. No. 14/204,404, filed Mar. 11, 2014, Patented.
U.S. Appl. No. 14/205,667, filed Mar. 12, 2014, Patented.
U.S. Appl. No. 14/221,930, filed Mar. 21, 2014, Patented.

(56) References Cited

OTHER PUBLICATIONS

U.S. Appl. No. 14/397,529, filed Oct. 28, 2014, Never Issued: Abandoned/Expired.
U.S. Appl. No. 14/397,534, filed Oct. 28, 2014, Never Issued: Abandoned/Expired.
U.S. Appl. No. 14/504,651, filed Oct. 2, 2014, Never Issued: Abandoned/Expired.
U.S. Appl. No. 14/607,676, filed Jan. 28, 2015, Never Issued: Abandoned/Expired.
U.S. Appl. No. 14/663,105, filed Mar. 19, 2015, Patented.
U.S. Appl. No. 14/681,669, filed Apr. 8, 2015, Patented.
U.S. Appl. No. 14/729,277, filed Jun. 3, 2015, Never Issued: Abandoned/Expired.
U.S. Appl. No. 14/740,736, filed Jun. 16, 2015, Patented.
U.S. Appl. No. 14/915,031, filed Feb. 26, 2016, Patented.
U.S. Appl. No. 14/935,642, filed Nov. 9, 2015, Patented.
U.S. Appl. No. 15/090,881, filed Apr. 5, 2016, Patented.
U.S. Appl. No. 15/105,011, filed Sep. 6, 2016, Patented.
U.S. Appl. No. 15/253,506, filed Aug. 31, 2016, Pending.
U.S. Appl. No. 15/285,947, filed Oct. 5, 2016, Patented.
U.S. Appl. No. 15/349,636, filed Nov. 11, 2016, Patented.
U.S. Appl. No. 15/349,729, filed Nov. 11, 2016, Pending.
U.S. Appl. No. 15/385,432, filed Dec. 20, 2016, Patented.
U.S. Appl. No. 15/385,519, filed Dec. 20, 2016, Patented.
U.S. Appl. No. 15/546,373, filed Jul. 26, 2017, Patented.
U.S. Appl. No. 15/729,321, filed Oct. 10, 2017, Pending.
U.S. Appl. No. 15/789,069, filed Oct. 20, 2017, Patented.
U.S. Appl. No. 15/826,177, filed Nov. 29, 2017, Patented.
U.S. Appl. No. 15/895,537, filed Feb. 13, 2018, Patented.
U.S. Appl. No. 15/910,891, filed Mar. 2, 2018, Pending.
U.S. Appl. No. 15/955,737, filed Apr. 18, 2018, Patented.
U.S. Appl. No. 16/094,198, filed Oct. 16, 2018, Pending.
U.S. Appl. No. 16/104,028, filed Aug. 16, 2018, Patented.
U.S. Appl. No. 16/104,035, filed Aug. 16, 2018, Patented.
U.S. Appl. No. 16/104,043, filed Aug. 16, 2018, Patented.
U.S. Appl. No. 16/115,055, filed Aug. 28, 2018, Patented.
U.S. Appl. No. 16/515,119, filed Jul. 18, 2019, Pending.
U.S. Appl. No. 16/515,151, filed Jul. 18, 2019, Pending.
U.S. Appl. No. 16/595,559, filed Oct. 8, 2019, Pending.
U.S. Appl. No. 16/717,369, filed Dec. 17, 2019, Pending.
U.S. Appl. No. 16/956,564, filed Jun. 20, 2020, Pending.
U.S. Appl. No. 16/956,576, filed Jun. 20, 2020, Pending.
U.S. Appl. No. 16/956,579, filed Jun. 20, 2020, Pending.
U.S. Appl. No. 16/956,580, filed Jun. 20, 2020, Pending.
U.S. Appl. No. 16/987,913, filed Aug. 7, 2020, Pending.
U.S. Appl. No. 16/988,011, filed Aug. 7, 20020, Pending.
U.S. Appl. No. 17/129,606, filed Dec. 21, 2020, Pending.
Schlosser, "Binding kinetics of water disinfection by-products," Dissertation, Heidelberg University, 2018, pp. 36-37.
Mexican Institute of Industrial Property, Office Action in Mexican Patent Application No. MX/a/2020/014211 (May 6, 2024).
Taiwan Intellectual Property Office, Office Action in Taiwan Patent Application No. 109145567 (Jun. 11, 2024).
Japan Patent Office, Notification of Reasons for Refusal in Japanese Patent Application No. 2020-213765 (Dec. 11, 2024).
U.S. Appl. No. 17/551,371, Alkan et al., filed Dec. 15, 2021, Pending.
U.S. Appl. No. 17/551,547, Alkan et al., filed Dec. 15, 2021, Pending.
U.S. Appl. No. 18/191,076, Aepil et al., Mar. 28, 2023, Pending.
Mexican Institute of Industrial Property, Second Office Action in Mexican Patent Application No. MX/a/2020/014211 (Oct. 28, 2024).
Japan Patent Office, Notifice of Reasons for Refusal in Japanese Patent Application No. 2020-213765 (Jun. 4, 2025).

* cited by examiner

Copolyamide (A)

Fig. 1

Polyamide (PA2)

Fig. 2

Polyamide (PA3)

Fig. 3

Polyamide (PA4)

Fig. 4

METHOD OF MANUFACTURING A MOLD THAT IS RESISTANT TO HYPOCHLORITE

CROSS-REFERENCE TO A RELATED APPLICATION

This patent application claims the benefit of European Patent Application No. EP 19 219 338.1, filed on Dec. 23, 2019, the disclosure of which is incorporated herein by reference in its entirety for all purposes.

BACKGROUND OF THE INVENTION

The present invention relates to the use of a polyamide molding compound for application purposes in which a high resistance to hypochlorous acid is decisive. The molding compound is thus used in accordance with the invention for molds that are suitable for contact with aqueous solutions containing hypochlorous acid.

EP 1 291 073 A1 relates to polyamide microcapsules that are obtained by contacting aqueous phases that contain diamines and anionic polymers and/or heteropolysaccharides in dissolved form with oil phases that contain dissolved dicarboxylic acid halides while forming a W/O emulsion, hardening with a calcium salt solution and filtering, washing and drying. The polyamide microcapsules are described as stable toward hypochlorite lye and are used for the purpose of cosmetics.

EP 3 502 188 A1 relates to a polyamide molding compound, in particular for use in the drinking water sector, that is for the manufacture of moldings where the processed molding compound comes into contact with drinking water on the intended use. Resistance toward hypochlorite is, however, not named, nor is an area of use of the polyamide molding compound for molds that come into contact with solutions containing hypochlorite on their intended use.

EP 3 369 761 A1 relates to an amorphous or microcrystalline copolyamide (A) containing the following monomers: (a) at least one cycloaliphatic diamine; (b) 0.25 to 4.4 mol % of at least one dimer fatty acid; and (c) 12 to 49.75 mol % of at least one aromatic dicarboxylic acid selected from the group comprising isophthalic acid, terephthalic acid, and naphthalenedicarboxylic acid; and (d) 0 to 37.75 mol % of at least one aliphatic dicarboxylic acid, where the molar portion of isophthalic acid is at least equal to the molar portion of terephthalic acid, and where the monomers (b), (c), and optionally (d) add up to 50 mol % and the molar portions of all the monomers contained in the copolyamide (A) sum to 100 mol %. The invention further relates to molding compounds including the copolyamide (A), molds therefrom, and their use. The use of said polyamide molding compounds is, however, restricted to fields in which there is no contact with solutions containing hypochlorite. A stability of the molding compound with respect to solutions containing hypochlorite is not named.

Copolyamides are known from EP 0 469 435 A1 that are characterized for the manufacture of molds having a high glass transition temperature, stiffness, and impact resistance. In addition, a method of manufacturing these copolyamides and their use for the manufacture of molds are disclosed.

BRIEF SUMMARY OF THE INVENTION

Starting from this, it was the object of the present invention to find suitable polyamides that enable a use in which the the polyamide molding compound is exposed in use to solutions containing hypochlorite. The use here should enable an improved stability with respect to applications known from the prior art. An improved stability here means a weight change that is as small as possible on storage of the molding compounds in accordance with the invention in solutions containing hypochlorite. With transparent copolyamide molding compounds, an improved stability in particular means an improved maintenance of the clarity of the molding compound. With non-transparent copolyamide molding compounds, e.g. with molding compounds provided with fillers, an improved stability is in particular characterized by an improved maintenance of the mechanics, in particular of the tear force.

This object is achieved by the features of the invention described herein, and the advantageous further developments thereof.

DEFINITIONS OF TERMS

Notation and Abbreviations for Polyamides and their Monomers

In the sense of the present invention, the term "polyamide" (abbreviation PA) is understood as an umbrella term; it comprises homopolyamides and copolyamides. The selected notation and abbreviations for polyamides and their monomers correspond to those set forth in the ISO standard 1874-1 (2011, (D)). The abbreviations used therein are used in the following as synonymous with the IUPAC names of the monomers. MACM for bis(4-amino-3-methyl-cyclohexyl) methane (also called 3,3'-dimethyl-4,4'-diaminodicyclohexylmethane, CAS-No. 6864-37-5); TMDC for bis(4-amino-3,5-dimethyl-cyclohexyl) methane (also called 3,3', 5,5'-tetramethyl-4,4'-diaminodicyclohexylmethane, CAS No. 65962-45-0); PACM for bis(4-amino-cyclohexyl) methane (also called 4,4'-diaminodicyclohexylmethane, CAS No. 1761-71-3); T for terephthalic acid (CAS No. 100-21-0); I for isophthalic acid (CAS No. 121-95-5); 36 for dimer fatty acid having 36 carbon atoms (CAS No. 68783-41-5 or 61788-89-4); 12 for dodecane diacid (also called 1, 10-decanedicarboxylic acid, CAS No. 693-23-2); CHD for 1,4-cyclohexanedicarboxylic acid (CAS No. 1076-97-7).

Amorphous or Microcrystalline Polyamides

Amorphous or microcrystalline polyamides preferably display a melting heat of a maximum of 30 J/g, particularly preferably of a maximum of 25 J/g, very particularly preferably of 0 to 22 J/g, at a heating rate of 20 K/min in dynamic differential scanning calorimetry, (DSC) in accordance with ISO 11357 (2013).

Microcrystalline polyamides are semi-crystalline polyamides and therefore have a melting point. However, they have a morphology in which the crystallites have such a small dimension that a plate manufactured therefrom having a thickness of 2 mm is still transparent, i.e. its light transmission amounts to at least 75% measured in accordance with ASTM D 1003-13 (2013).

The melting point measured according to ISO 11357 (2013) preferably amounts to a maximum of 255° C. for the microcrystalline polyamides used for the polyamide molding compound in accordance with the invention.

Amorphous polyamides have a smaller melting heat compared with the microcrystalline polyamides. The amorphous polyamides preferably display a melting heat of a maximum of 5 J/g, particularly preferably of a maximum of 3 J/g, very particularly preferably of 0 to 1 J/g at a heating rate of 20 K/min in dynamic differential scanning calorimetry (DSC) in accordance with ISO 11357 (2013).

Amorphous polyamides have no melting point due to their amorphicity.

Amorphous polyamides are transparent, i.e. their light transmission amounts to at least 80%, preferably at least 85%, particularly preferably at least 90%, measured at 2 mm thick plates according to ASTM D 1003-13 (2013).

Non-Transparent, Opaque

In the sense of the present invention, opaque is understood as a light transmission of less than 80%, measured at 2 mm thick plates according to ASTM D 1003-13 (2013).

Dimer Fatty Acids

In the sense of the present invention, dimer fatty acids (b) have at least 28 carbon atoms (C atoms). They are obtained by dimerization of unsaturated monocarboxylic acids, with the dimerization preferably being performed catalytically. Dimer fatty acids in accordance with the present invention are dicarboxylic acids. The dimer fatty acids are preferably partially saturated, they are particularly preferably completely saturated.

Aliphatic Dicarboxylic Acid

Dicarboxylic acids having 6 to 22 carbon acids are understood as aliphatic dicarboxylic acids (d) in the sense of the present invention. They can be linear, branched, or cycloaliphatic and are present in saturated form.

Indications of Quantity of the Monomers

The copolyamides in accordance with the invention only include dicarboxylic acids and diamines. Their molar quantities add up to 50 mol % for the sum of all the diamines and 50 mol % for the sum of all the dicarboxylic acids and the sum of the diamino acid and dicarboxylic acid quantities produces 100 mol % for the copolyamide.

It applies to the indications of quantity of the dicarboxylic acids and of the diamines of the copolyamides that the sum of the molar quantities of all the diamines is substantially equal to the sum of the molar quantities of all the dicarboxylic acids. Substantially equal here means a maximum surplus of the dicarboxylic acids or of the diamines of 3%, i.e. the molar ratio of dicarboxylic acids to diamines is 1.03:1 to 1:1.03. A maximum surplus of the dicarboxylic acids or of the diamines of 2% is preferred, i.e. the molar ratio of dicarboxylic acids to diamines amounts to 1.02:1 to 1:1.02.

The surplus serves the balancing of losses of monomer and/or the regulation of the relative viscosity of the polyamide and thus of the molar mass.

The indications of quantity with respect to the monomers are here to be understood such that a corresponding molar ratio of these monomers used in the polycondensation is also again found in the copolyamides manufactured by polycondensation.

General Remarks on the Indications of Quantity

The molding compounds in accordance with the present invention preferably only contain the components (A), (C), and optionally (B); the proviso applies here that the components (A), (C), and optionally (B) add up in sum to 100 wt %. The fixed ranges of the indications of quantity for the individual components (A), (B), and (C) are to be understood such than an arbitrary quantity for each of the individual components can be selected within the specified ranges provided that the strict provision is satisfied that the sum of the components (A) to (C) produces 100 wt %.

The quantity indications of the diamines and dicarboxylic acids contained in the copolyamide (A) respectively add up to 50 mol %. All the monomers contained in the copolyamide (A) add up to 100 mol % in sum. The fixed ranges of the indications of quantity for the individual monomers are to be understood such than an arbitrary quantity for each of the individual components can be selected within the specified ranges provided that the strict provision is satisfied that the sum of all the monomers contained in the copolyamide (A) produces 100 mol %.

Hypochlorous Acid, Hypochlorite

Both terms are used as synonyms in with respect to aqueous solutions or resistance in the sense of the present invention since aqueous solutions thereof contain both species in equilibrium.

Figure 2:
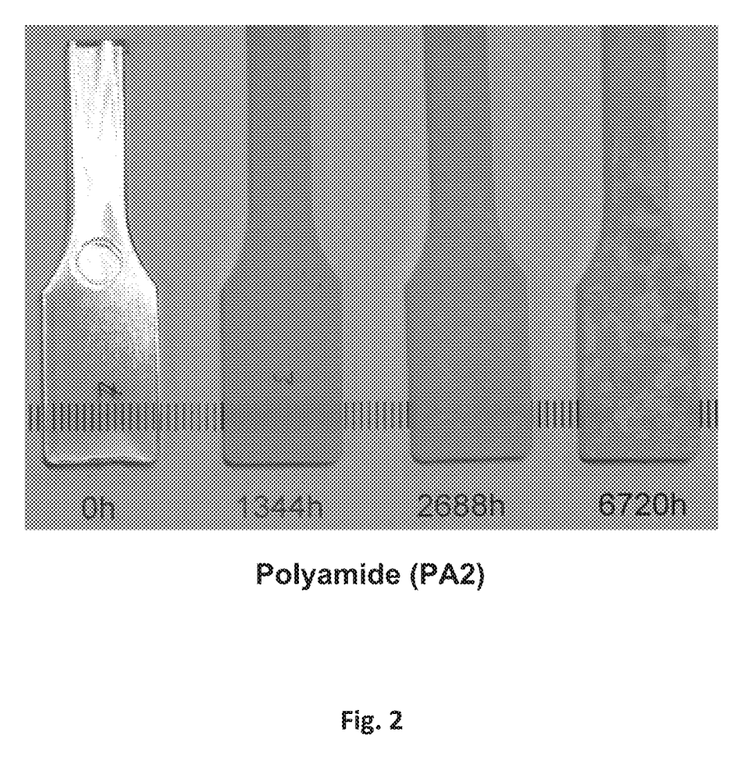
FIG. 2 depicts the hypochlorite resistance of a mold prepared from a comparative polyamide.

This equilibrium between hypochlorous acid and hypochlorite is dependent on the pH (see Formation kinetics of water disinfection byproducts-Dissertation of Tim Schlosser, Heidelberg 2018, pages 36-37) and with a pH of 6.8 is on the side of the hypochlorous acid. A composition of approximately 80% hypochlorous acid and approximately 20% hypochlorite can be read for a pH of 6.8 from the Hägg diagram for the relevant pH range $6.5 \leq pH \leq 7.8$ (FIG. 2.5, page 37) in accordance with DIN 19643 (Treatment of water of swimming pools and baths).

Solutions Containing Hypochlorite

In the sense of the present invention, the term "solutions containing hypochlorite" comprises solutions of hypochlorite ions (e.g. a solution of sodium hypochlorite or hypochlorous acid) in water and thus a mixture of hypochlorous acid and hypochlorite, with their concentration ratio being dependent on the pH.

Hypochlorite Storage

In the sense of the present invention, the term "hypochlorite storage" comprises the storage of test specimens (tensile bars) in a solution of hypochlorite ions (e.g. a solution of sodium hypochlorite or hypochlorous acid) in water and thus a mixture of hypochlorous acid and hypochlorite, with their concentration ratio being dependent on the pH.

The present invention thus relates to the use of a copolyamide molding compound comprising at least one amorphous or microcrystalline copolyamide (A) that contains the following monomers:
  (a) at least one cycloaliphatic diamine;
  (b) 0.25 to 10 mol % of at least one dimer fatty acid; and
  (c) 12 to 49.75 mol % of at least one aromatic dicarboxylic acid selected from the group comprising isophthalic acid, terephthalic acid, and naphthalenedicarboxylic acid; and
  (d) 0 to 37.75 mol % of at least one aliphatic dicarboxylic acid;
  where the molar portion of isophthalic acid is at least equal to the molar portion of terephthalic acid; and
  where the monomers (b), (c), and optionally (d) add up to 50 mol % and the molar portions of all the monomers contained in the copolyamide (A) add up to 100 mol %,
  for the manufacture of molds resistant to aqueous solutions containing hypochlorous acid and/or its salts.

Resistant means a weight change of the stored mold after 8064 h storage, measured as described herein, of a maximum of 2%, preferably of a maximum of 1.5%, particularly preferably of a maximum of 1%; and/or a tear force of the stored mold after 8064 h storage, measured as described under "Measurement methods," of at least 70%, preferably 75%, particularly preferably 80%, of the value of the tear force of the non-stored test specimen.

In the search for suitable polyamides that can achieve the above-named object, it was surprisingly found that the polyamides described herein have a high resistance to solutions containing hypochlorite and are thus suitable for the purposes in accordance with the invention.

A preferred embodiment of the use in accordance with the invention provides a use for manufacturing a mold selected from the group comprising elements for conveying and/or storing drinking water or hot water, components in swimming baths, whirlpools, heating systems or in the sanitary area (kitchen, bath, sauna, toilet), mountings, fittings, housings, mixers, faucets, filter housings, water meters, water meter components (bearings, propellers, pilons), valves, valve components, (housings, shut-off spheres, sliders, cylinders), distributors, cartridges, pumps, pump components (blade wheels, impellers), inspection glasses, covers, lines, or containers, and elements or members thereof.

The at least one amorphous or microcrystalline copolyamide (A) particularly preferably contains the following monomers having the following mol portions:
- 40 to 50 mol %, preferably 48 to 50 mol %, and in particular preferably 50 mol % cycloaliphatic diamine (a); and
- 1 to 7.5 mol %, preferably 1.5 to 4.4 mol %, in particular preferably 1.7 to 3.0 mol % dimer fatty acid; (b), and
- 14 to 44 mol %, preferably 23 to 38.5 mol %, particularly preferably 25.5 to 33.3 mol % aromatic dicarboxylic acid (c), and optionally
- 5 to 35 mol %, preferably 10 to 25.5 mol %, and particularly preferably 15 to 22.8 mol % aliphatic dicarboxylic acid (d);
- where the portions of all the monomers contained in the copolyamide (A) add up to 100 ml %.

The use in accordance with the invention advantageously further provides that the at least one amorphous or microcrystalline copolyamide (A) contains isophthalic acid and preferably also terephthalic acid as the aromatic dicarboxylic acid (c), where
- the portion of isophthalic acid related to the sum of all the monomers in the copolyamide (A) amounts to 6 to 49.75 mol %, preferably 7 to 44 mol %, particularly preferably 11.5 to 27 mol %, and in particular preferably 12.75 to 20.55; and/or
- the portion of terephthalic acid related to the sum of all the monomers in the copolyamide (A) amounts to 0 to 24.875 mol %, preferably 0 to 22 mol %, particularly preferably 11.5 to 19.25 mol %, and in particular preferably 12.75 to 16.65 mol %.

It is additionally advantageous that the at least one amorphous or microcrystalline copolyamide (A) has
- a glass transition temperature measured according to ISO 11537-2 (2013) at pellets having a water content of less than 0.1 wt % of at least 155° C., preferably at least 170° C., in particular preferably at least 180° C., particularly preferably at least 190° C., and very particularly preferably 200 to 240° C.;
and/or
- a light transmission measured according to ASTM D 1003-13 (2013) at a plate produced thereof having a thickness of 2 mm of at least 80%, preferably at least 85%, and particularly preferably at least 90%.

Provision is made in accordance with a further preferred embodiment that the at least one amorphous or microcrystalline copolyamide (A) contains at least one aliphatic dicarboxylic acid having 6 to 22 carbon atoms as a further monomer (d).

Provision is made in accordance with a further preferred embodiment that the at least one amorphous or microcrystalline copolyamide (A) contains at least the following monomers:
- (a) at least one cycloaliphatic diamine component selected from the group comprising bis(4-amino-3-methylcyclohexyl) methane, bis-(4-aminocyclohexyl) methane, bis-(4-amino-3-ethylcyclohexyl) methane, bis-(4-amino-3,5,-dimethylcyclohexyl) methane, 2,6-norbornane diamine or 2,6-bis-(aminomethyl)-norbornane, 1,3-diaminecyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diamonodicyclohexyl)propane, and mixtures thereof; and
- (b) at least one dimer fatty acid selected from the group consisting of dimer fatty acids having 36 or 44 C atoms and mixtures thereof; and
- (c) at least one aromatic dicarboxylic acid selected from the group comprising isophthalic acid, terephthalic acid; and mixtures thereof; and optionally
- (d) at least one aliphatic dicarboxylic acid selected from the group comprising 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,18-octadecanedioic acid, 1,3-cyclohexanedicarboxylic acid, 1,4-cyclohexanedicarboxylic acid; and mixtures thereof.

It is furthermore advantageous that the at least one amorphous or microcrystalline copolyamide (A) contains at least the following monomers:
- (a) at least one cycloaliphatic diamine component selected from the group comprising bis-(4-amino-3-methyl-cyclohexyl)-methane, bis-(4-amino-cyclohexyl)-methane, bis-(4-amino-3,5-dimethyl-cyclohexyl)-methane and mixtures thereof and is preferably selected from the group comprising bis-(4-amino-3-methyl-cyclohexyl)-methane, bis-(4-amino-3,5-dimethyl-cyclohexyl)-methane and mixtures thereof; and
- (b) at least one dimer fatty acid having 36 C atoms; and
- (c) isophthalic acid and terephthalic acid; and optionally
- (d) at least one aliphatic dicarboxylic acid selected from the group consisting of 1,12-dodecanedioic acid; 1,14 tetradecanedioic acid; 1,18-octadecanedioic acid; and mixtures thereof.

In accordance with the invention, in particular copolyamides selected from the group comprising MACMI/MACM12/MACM36, MACMI/MACM14/MACM36, MACMI/MACM9/MACM36, MACMI/MACMCHD/MACM36, MACMI/MACM11/MACM36, MACMI/MACM13/MACM36, MACMI/MACM18/MACM36, MACMI/MACMT/MACM36, MACMI/MACM36, MACMI/MACMT/MACM12/MACM36, MACMI/MACMT/MACM14/MACM36, MACMI/MACMT/MACM18/MACM36, MACMI/MACMT/MACM9/MACM36, MACMI/MACMT/MACMCHD/MACM36, MACMI/MACMT/MACM12/MACMCHD/MACM36 and mixtures thereof are used,
- where MACM can wholly or partially be replaced with TDMC; and/or where the dimer fatty acid having 36 carbon atoms can be wholly or partially replaced with a dimer fatty acid having 44 carbon atoms as the at least one amorphous or microcrystalline copolyamide (A).

Even further preferably, the invention relates to the use of a copolyamide selected from the group comprising MACMI/MACM12/MACM36, MACMI/MACM14/MACM36, MACMI/MACM18/MACM36, MACMI/MACMT/MACM36, MACMI/MACM36, MACMI/MACMT/MACM12/MACM36, MACMI/MACMT/MACM14/MACM36, MACMI/MACMT/MACM18/MACM36; and mixtures thereof, where MACM can wholly or partially be replaced with TDMC; and/or where the dimer fatty acid having 36 carbon atoms can be wholly or partially replaced with a dimer fatty acid having 44 carbon atoms as the at least one amorphous or microcrystalline copolyamide (A).

The invention in particular relates to the use of a copolyamide selected from the group comprising MACMI/MACM12/MACM36, MACMI/MACM14/MACM36, MACMI/MACMT/MACM36, MACMI/MACM36, MACMI/MACMT/MACM12/MACM36, MACMI/MACMT/MACM14/MACM36 MACMI/MACM12/MACM36, MACMI/MACM14/MACM36, MACMI/MACMT/MACM36, MACMI/MACM36, MACMI/MACMT/MACM12/MACM36, MACMI/MACMT/MACM14/MACM36; and mixtures thereof.

The copolyamide (A) is transparent.

Provision can be made in the use in accordance with the invention that the copolyamide molding compound contains at least one amorphous or microcrystalline copolyamide (A) and optionally at least one inorganic filler (B) and/or optionally at least one additive (C), and/or optionally at least one further polymer (D) that differs from the copolyamide (A) and from the additive (C).

The copolyamide molding compound preferably does not contain any further polyamide and/or copolyamide, preferably no further thermoplastic.

The copolyamide molding compound particularly preferably comprises at least one amorphous or microcrystalline copolyamide (A) and at least one additive (C).

The use very particularly preferably relates to the use of a copolyamide molding compound that has the following composition:

46 to 100 wt %, preferably 57 to 99.99 wt %, and particularly preferably 63 to 99.9 wt % amorphous or microcrystalline copolyamide (A); and 0 to 50 wt %, preferably 0 to 40 wt %, and particularly preferably 0 to 35 wt % filler (B); and 0 to 4 wt. %, preferably 0.01 to 3 wt. %, and particularly preferably 0.1 to 2 wt % additive (C), where the components (A) to (C) add up to 100 wt %.

In a further very particularly preferred embodiment of the use in accordance with the invention, the copolyamide molding compound has the following composition:

96 to 100 wt %, preferably 97 to 99.99 wt %, and particularly preferably 98 to 99.9 wt % amorphous or microcrystalline copolyamide (A); and 0 to 4 wt. %, preferably 0.01 to 3 wt. %, and particularly preferably 0.1 to 2 wt % additive (C), where the components (A) to (C) add up to 100 wt %.

The components (B) and (C) will be described in more detail in the following.

Component (B)

The term fillers (component (B)) comprises fibrous or acicular fillers, particle-shaped fillers and mixtures thereof.

The fillers can preferably be coated or surface treated, i.e. they can be equipped with a suitable finishing or bonding agent system or can be otherwise surface activated. Systems on a basis of urethanes, silanes, epoxides, polyamides, polyhydroxyethers, acrylates, respective combinations or mixtures thereof can be used for this purpose, for example. The smoothing or bonding agent systems can also contain other auxiliary agents such as static inhibitors or mold lubricants.

The fibrous or acicular fillers are preferably selected from the group consisting of glass fibers, carbon fibers, basalt fibers, boron fibers, slag fibers, metal fibers, whiskers, mineral fibers, Wollastonite, aramid fibers, ground glass fibers, ground carbon fibers, ground mineral fibers and mixtures thereof. The fibrous or acicular fillers are particularly preferably selected from the group consisting of glass fibers, carbon fibers, basalt fibers, boron fibers, aramid fibers, and mixtures thereof. Exclusively glass fibers are very particularly preferably used as fibrous or acicular fillers.

Staple fibers or continuous fibers (rovings) can be used with the glass fibers or carbon fibers.

The glass fibers or carbon fibers have a cross-section that is circular (round), oval, elliptical, having restriction(s), elliptically (so-called cocoon fibers), angular, or rectangular. Fibers having a non-circular cross-section, in particular oval, elliptical, having restriction(s), elliptically (so-called cocoon fibers), angular, or rectangular fibers, are also called flat fibers. Mixtures of circular and non-circular fibers can also be used.

The appearance of the glass fibers can be stretched or spiral.

Glass fibers from all glass types such as A-, C-, D-, E-, E-CR-, L-, LD-, M-, NE-, S-, R-, AR-glass or any desired mixtures thereof can be used. Glass fibers of E-glass, S-glass, or mixtures of E and/or S-glass fibers are preferred.

The staple glass fibers have a fiber length of 1 to 50 mm, preferably 1 to 25 mm, preferably 1.5 to 20 mm, particularly preferably 2 to 12 mm, and very particularly preferably 2 to 8 mm.

The glass fibers preferably have a diameter of 5 to 20 μm, preferably of 5 to 15 μm, and particularly preferably of 6 to 12 μm.

If the glass fibers are used as continuous fibers (rovings) in a pultrusion process, they preferably have a diameter of a maximum of 20 μm, preferably of a maximum of 18 μm, particularly preferably of 10 to 17 μm.

The carbon fibers preferably have a diameter of 3 to 12 μm, preferably 4 to 10 μm, particularly preferably 4 to 9 μm.

With flat fibers, the aspect ratio, i.e. the ratio of the main cross-sectional axis to the secondary cross-sectional axis amounts 1.5 to 8, preferably 2 to 6, particularly preferably 2.5 to 5, very particularly preferably 3 to 4.

Flat glass fibers are particularly preferably from the flat fibers.

The cross-sectional axes of the flat glass fibers are 3 to 40 μm long. The length of the secondary cross-sectional axis preferably amounts to 3 to 20 μm, particularly preferably 4 to 10 μm, and the length of the main cross-sectional axis to 6 to 40 μm, particularly preferably 12 to 30 μm.

The particle shaped fillers are preferably selected from the group comprising dolomite, silicates, quartz, talcum, mica, kaolin, perlite, silica, precipitated or pyrogenic silicon dioxide, diatomite, titanium dioxide, magnesium carbonate, magnesium hydroxide, aluminum hydroxide, ground or precipitated calcium carbonate, chalk, calcium, limestone dust, slate flour, feldspar, barium carbonate, barium sulfate, synthetic sheet silicates, natural sheet silicates, permanent magnetic or magnetizable metals or alloys, glass flakes, glass spheres, hollow glass spheres, hollow spherical silicate fillers, and mixtures thereof. The particle shaped fillers are particularly preferably selected from the group comprising silicates, quartz, talcum, mica, kaolin, perlite, silica, precipitated or pyrogenic silicon dioxides, diatomite, titanium dioxide, magnesium carbonate, magnesium hydroxide, aluminum hydroxide, ground or precipitated calcium carbonate, chalk, calcium, limestone dust, slate flour, feldspar, barium carbonate, barium sulfate, synthetic sheet silicates, natural sheet silicates, glass flakes, glass spheres, hollow glass spheres, hollow spherical silicate fillers, and mixtures thereof. The particle-shaped fillers are very particularly preferably selected from the group comprising silicates, talcum, mica, kaolin, titanium dioxide, ground or precipitated calcium carbonate, chalk, limestone dust, slate flour, synthetic sheet silicates, natural sheet silicates, permanent magnetic or magnetizable metals or alloys, glass flakes, glass spheres, hollow glass spheres, and mixtures thereof.

At least one fibrous or acicular filler or a mixture of at least one fibrous or acicular filler with at least one particle shaped filler is preferably used as the filler (component (B)) in the polyamide molding compound in accordance with the invention.

If a mixture of at least one fibrous or acicular filler with at least one particle shaped filler is used, the proportion of the particle shaped filler makes up a maximum of half, preferably a maximum of a third, particularly preferably a maximum of a quarter, of the total amount of the filler.

Exclusively fibrous or acicular fillers are particularly preferably used as the filer in the polyamide molding compound in accordance with the invention.

Component (C)

In accordance with a preferred embodiment of the present invention, the at least one additive (component (C)) is selected from the group consisting of inorganic and organic stabilizers, in particular antioxidants, antiozonants, light stabilizers, in particular UV stabilizers, UV absorbers, or UV blockers, mold lubricants, dyestuffs, marking agents, pigments, black carbon, graphite, graphene, carbon nanotubes, photochromic agents, static inhibitors, demolding means, antiblocking agents, chain extending additives, chain shortening additives, optical brighteners, IR absorbers, NIR absorbers, and mixtures thereof.

Of the organic stabilizers, phenol compounds, phosphite compounds, and phosphonite compounds, stabilizers on a hindered amine base (HALS) or their mixtures are particularly preferred.

The at least one additive can also be added in masterbatch form. A polyamide is preferably used as the base polymer of the masterbatch. This polyamide is preferably selected from the group consisting of PA 12, PA 1010, PA 1012, PA 1212, PA 6/12, PA 612, PA MACM12 and their mixtures or consists of the copolyamide (A) itself.

The base polymer of the masterbatch is very particularly preferably the copolyamide (A) itself.

The present invention will be explained in more detail with reference to the following embodiments and experiments without restricting the invention to the shown specific embodiments.

Measurement Methods

Relative Viscosity

The relative viscosity was determined in accordance with IS 307 (2007) at 20° C. 0.5 g polymer pellets were weighed into 100 ml m-cresol for this purpose; the calculation of the relative viscosity (RV) according to RV=t/t0 took place on the basis of section 11 of the standard.

Glass Transition Temperature (Tg) and Melting Point

The determination took place in accordance with ISO 11357-2 and -3 (2013) at pellets having a water content of below 0.1 wt %.

Differential scanning calorimetry (DSC) was performed in each of the two heating steps at a heating rate of 20 K/min. The sample was quenched in dry ice after the first heating. The melting point was determined in the second heating. The melting point was determined in the second heating.

The temperature at the peak maximum is specified as the melting point. The center of the glass transition zone, that is here specified as the glass transition temperature (Tg), was determined using the "half height" method.

Weight Change

The determination of the weight change took place at stored ISO tensile bars.

The weight change of tensile bars only stored in water was subtracted from the weight change of the tensile bars stored in the aqueous hypochlorite solution. The weight increase likewise occurring in the storage in aqueous hypochlorite solution by water absorption was thereby eliminated.

Tear Force

The determination of the tear force took place at ISO tensile bars (Type A1, mass 170×20/10×4) manufactured in accordance with the standard: ISO/CD 3167 (2003) stored in an aqueous hypochlorite solution.

The measurement was performed analogously to the measurement of the tear strength in accordance with ISO 527 (2012) at 23° C. at a traction speed of 50 mm/min with non-reinforced materials and 5 mm/min with reinforced materials. The absolute force was used directly as the measured value, i.e. without division by the cross-sectional surface of the test specimen.

Light Transmission

The light transmission was determined at 23° C. in accordance with ASTM D 1003-13 (2013) at 60×60 mm plates (width×length) having a thickness of 2 mm and a film cast on a "Haze Gard plus" of Byk Gardner using CIE light type C. The light transmission value was given in % of the irradiated light amount.

Clarity

The clarity was determined at 23° C. in accordance with ASTM D 1003 (2013) at the ends of the ISO tensile bars stored in an aqueous hypochlorite solution and already used in determining the tear force on a "Haze Gard plus" of Byk Gardner using CIE light type C. It is measured at an angular range less than 2.5° of the incident light beam and is given in % of the irradiated amount of light.

Storage Conditions

The specimen was removed at the same times in both stores, and indeed in each case after 1344 h, 4032 h, 5376 h, 6720 h, and 8064 h. 5 ISO tensile bars (Type A1, mass 170×20/10×4, manufactured in accordance with the standard: ISO/CD 3167 (2003)) were stored per material and storage time and the arithmetic mean of the 5 measured values was formed.

The water storage took place at thermostat regulated 60° C. in deionized water.

The hypochlorite storage took place at thermostat regulated 60° C. in an aqueous sodium hypochlorite solution having a concentration of 10 mg/l in a test stand of HyperDES-watertechnology GmbH, Crailsheim, Germany, with a volume of 100 l. The sodium hypochlorite solution is circulated therein at 6 to 8 l/min, with the solution being set to a pH of 6.8 and a conductivity of 600 to 1200 μS. The sodium hypochlorite concentration, the pH, and the conductivity are automatically regulated during the total storage time by addition of 0.5 wt % sodium hypochlorite solution, 0.7 wt % sodium hydroxide solution, 0.7 wt % sulfuric acid, or deionized water. The pH and the sodium hypochlorite concentration are additionally checked once a week using the CHEMATEST 20s (obtainable from Swan Analytische Instrumente AG, Hinwil, Switzerland) by means of a colorimetric method using N,N-diethyl-1,4-phenylene diamine in accordance with DIN EN ISO 7393-2 (2012).

Manufacturing the Test Specimens

Pellets having a water content of less than 0.1 wt % were used to manufacture the test specimens.

The ISO tensile bars were manufactured on an injection molding machine of Arburg, model Allrounder 420 C 1000-250. Cylinder temperatures rising and falling from the feed to the nozzle were used in this process.

Non-Filled Copolyamide Molding Compounds (Co-)polyamide (A) and (PA2)
Cylinder temperatures: 280/285/290/295/300/290° C.
Tool temperature: 90° C.
Polyamide (PA3) and (PA4)
Cylinder temperatures: 265/270/275/280/285/280° C.
Tool temperature: 80° C.

Filled Copolyamide Molding Compounds

Copolyamide (A) with glass fibers
Cylinder temperatures: 290/295/300/305/310/300° C.
Tool temperature: 80° C.
Polyamide (PA5) with glass fibers
Cylinder temperatures: 320/325/330/335/340/330° C.
Tool temperature: 160° C.
Polyamide (PA6) with glass fibers
Cylinder temperatures: 310/315/320/325/330/325° C.
Tool temperature: 120° C.

The test specimens were used in the dry state if not otherwise specified; for this purpose they were stored for at least 48 h after the injection molding at room temperature in a dry environment, i.e. over silica gel.

TABLE 1

Materials used in the examples and in the comparison examples

| Components | Description | Manufacturer |
|---|---|---|
| Copolyamide (A) MACMI/ MACMT/ MACM12/ MACM36 | Amorphous polyamides of bis(4-amino-3-methyl-cyclohexyl)methane (50 mol %), isophthalic acid (14 mol %), terephthalic acid (14 mol %), 1,12-dodecanedioic acid (20 mol %) and dimer fatty acid having 36 C atoms (2 mol %) RV 1.62 (measured at 0.5 g in 100 ml m-cresol at 20° C.) | EMS-CHEMIE AG, Switzerland |
| Polyamide (PA2) 6T/6I/ MACMT/ MACMI/ PACMT/ PACMI/12 | Glass transition temperature 206° C. Light transmission at 2 mm thickness 93% Amorphous polyamide from 1,6-hexanediamine (39.0 mol %), bis(3-methyl-4-aminocyclohexyl)methane (7.1 mol %), bis(4-aminocyclohexyl)methane (2.5 mol %), isophthalic acid (24.3 mol %), terephthalic acid (24.3 mol %), and lauric lactam (2.8 mol %) RV 1.60 (measured at 0.5 g in 100 ml m-cresol at 20° C.) | EMS-CHEMIE AG, Switzerland |
| Polyamide (PA3) MACM12/ PACM12 | Glass transition temperature 159° C. Light transmission at 2 mm thickness 92% Amorphous polyamide of bis(3-methyl-4-amino-cyclohexyl)-methane (67 mol %), bis(4-amino-cyclohexyl)methane (33 mol %) and 1,12-dodecanedioic acid (50 mol %) RV 1.84 (measured at 0.5 g in 100 ml m-cresol at 20° C.) | EMS-CHEMIE AG, Switzerland |
| Polyamide (PA4) MACM12 | Glass transition temperature 145° C. Light transmission at 2 mm thickness 93% Amorphous polyamide of bis(3-methyl-4-amino-cyclohexyl)methane and 1,12-dodecanedioic acid RV 1.72 (measured at 0.5 g in 100 ml m-cresol at 20° C.) | EMS-CHEMIE AG, Switzerland |
| Polyamide (PA5) 6T/6I | Glass transition temperature 155° C. Light transmission at 2 mm thickness 94% Semi-crystalline polyamides from 1.6 hexane diamine (50 mol %), terephthalic acid (35 mol %), and isophthalic acid (15 mol %) RV 1.62 (measured at 0.5 g in 100 ml m-cresol at 20° C.) | EMS-CHEMIE AG, Switzerland |
| Polyamide (PA6) 10T/ 6T | Glass transition temperature 135° C. Melting point 325° C. Semi-crystalline polyamide from 1,10 decanediamine (41 mol %), 1,6 hexanediamine (9 mol %), and terephthalic acid (50 mol %) RV 1.63 (measured at 0.5 g in 100 ml m-cresol at 20° C.) | EMS-CHEMIE AG, Switzerland |
| Glass fiber | Glass transition temperature 115° C. Melting point 295° C. Round glass fiber 3 mm long Diameter 10 μm Trade name: CPIC ECT 301HP | Chongqing Polycomp International Corp., China |
| Stabilizer | Pentaerythritol tetrakis-[3-(3,5-di-tert-butyl-4-hydroxyphenyl)propionates, an antioxidant on a sterically hindered phenol base CAS: 6683-19-8 Trade name: Irganox 1010 | BASF SE, Germany |

*RV relative viscosity measured at solution of 0.5 g polyamide in 100 ml m-cresol at 20° C.

TABLE 2

Experiment results-Weight change in %

| | Unit | Example 1 | Comparison examples 2 | 3 | 4 | Example 5 | Comparison examples 6 | 7 |
|---|---|---|---|---|---|---|---|---|
| (Co)polyamide | Wt. % | (A) 100 | (PA2) 100 | (PA3) 100 | (PA4) 100 | (A) 49.75 | (PA5) 49.75 | (PA6) 49.75 |
| Glass fiber | Wt. % | — | — | — | — | 50 | 50 | 50 |
| Stabilizer | Wt. % | — | — | — | — | 0.25 | 0.25 | 0.25 |

TABLE 2-continued

Experiment results-Weight change in %

| | | Example | Comparison examples | | | Example | Comparison examples | |
|---|---|---|---|---|---|---|---|---|
| | Unit | 1 | 2 | 3 | 4 | 5 | 6 | 7 |
| Storage time [h] | | | | | | | | |
| 0 | % | 0 | 0 | 0 | 0 | 0 | 0 | 0 |
| 1344 | % | 0.27 | 0.38 | 4.27 | −0.5 | 0.05 | −0.78 | −1.97 |
| 2688 | % | 0.36 | −0.5 | 8.83 | 0.67 | 0.03 | −2.54 | −5.41 |
| 4032 | % | 0.29 | −1.89 | 1.84 | 3.29 | 0.02 | −4.17 | −7.84 |
| 5376 | % | 0.35 | −2.22 | 11.51 | n.m. | −0.11 | n.m. | −11.15 |
| 6720 | % | 0.17 | −2.24 | 14.86 | 5.27 | −0.3 | −12.37 | −13.43 |
| 8064 | % | 0.12 | −3.39 | 15.81 | 9.02 | −0.53 | −14.69 | −15.89 |

TABLE 3

Trial results-Tear force in N and in % of the starting value

| | | Example | Comparison examples | |
|---|---|---|---|---|
| | Unit | 5 | 6 | 7 |
| (Co)polyamide | Wt. % | (A) 49.75 | (PA5) 49.75 | (PA6) 49.75 |
| Glass fiber | Wt. % | 50 | 50 | 50 |
| Stabilizer | Wt. % | 0.25 | 0.25 | 0.25 |

| | | Example | | Comparison examples | | | |
|---|---|---|---|---|---|---|---|
| Storage | | 5 | | 6 | | 7 | |
| time [h] | — | N | % | N | % | N | % |
| 0 | — | 6696 | 100 | 10511 | 100 | 8352 | 100 |
| 1344 | — | 5457 | 82 | 8490 | 81 | 6573 | 79 |
| 2688 | — | 5679 | 85 | 7948 | 77 | 6096 | 73 |
| 4032 | — | 5669 | 85 | 7482 | 71 | 5831 | 70 |
| 5376 | — | 5408 | 81 | n.m. | n.m. | 5598 | 67 |
| 6720 | — | 5725 | 85 | 6828 | 65 | 5330 | 64 |
| 8064 | — | 5584 | 83 | 6484 | 62 | 4904 | 59 | n.m.: not measured

TABLE 4

Experiment results—Clarity

| | | Example | Comparison examples | | |
|---|---|---|---|---|---|
| | Unit | 1 | 2 | 3 | 4 |
| (Co)polyamide | Wt. % | (A) 100 | (PA2) 100 | (PA3) 100 | (PA4) 100 |
| Storage time [h] | | | | | |
| 0 | % | 85 | 96 | 77 | 85 |
| 1344 | % | 80 | 12 | 12 | 86 |
| 2688 | % | 77 | 12 | 8 | 12 |
| 4032 | % | 60 | 12 | 9 | n.m. |
| 6720 | % | 70 | 12 | 12 | 12 | n.m.: not measured

As can be seen from the experiments, it has surprisingly been found that only a specific copolyamide (copolyamide A) has stability with respect to hypochlorite lye.

It could thus surprisingly be found that on storage of a mold in an aqueous solution containing hypochlorite, a constant weight could only be recorded with copolyamide A. The weight increase or weight reduction observed in the other polyamides of the comparison experiments was not able to be recorded. It is assumed that a weight increase indicates an oxidation of the copolyamide while forming a hydrogel layer at the surface and a subsequent water storage. A weight reduction allows an oxidative reduction of the copolyamide to be assumed. Damage to the copolyamide occurs in both cases.

Figure 1:
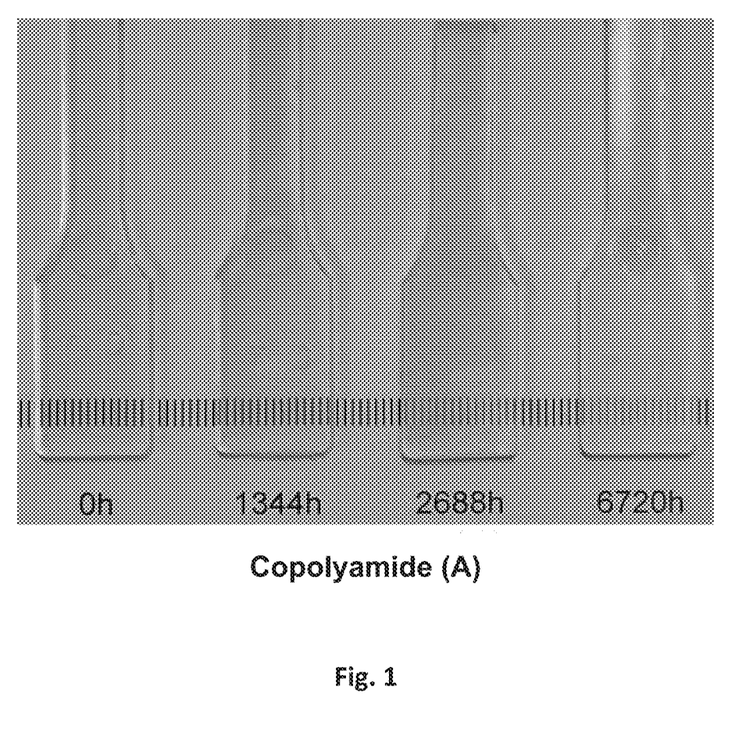
FIG. 1 depicts the hypochlorite resistance of a mold prepared from a copolyamide in accordance with an embodiment of the invention.
Figure 3:
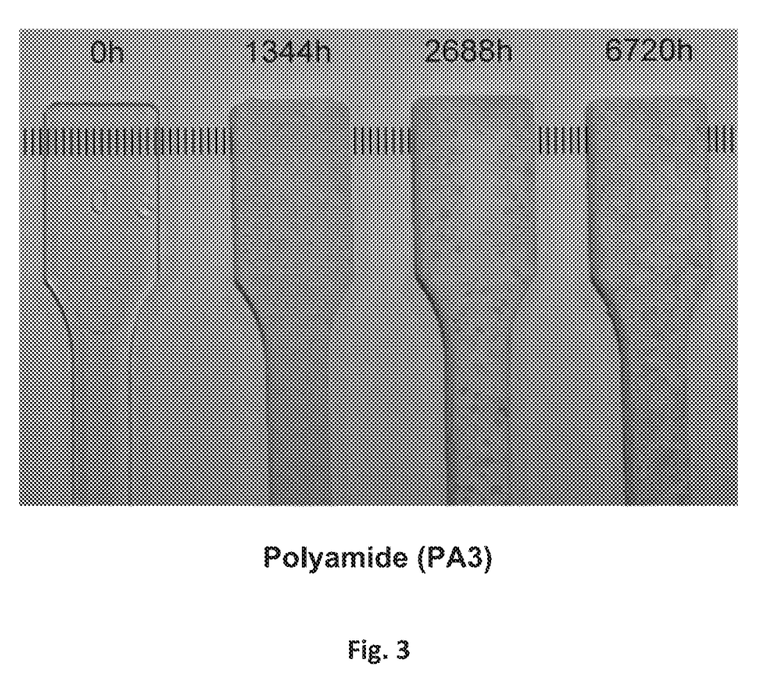
FIG. 3 depicts the hypochlorite resistance of a mold prepared from another comparative polyamide.
Figure 4:
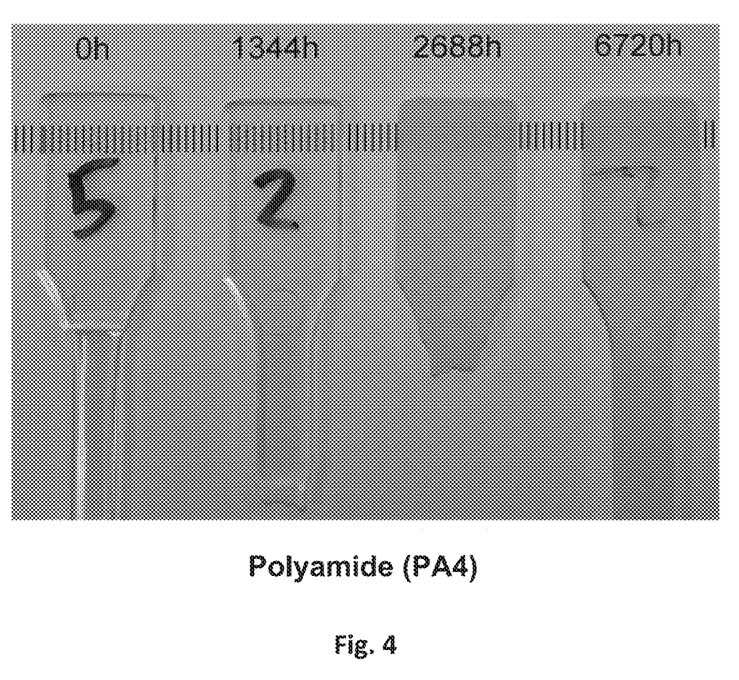
FIG. 4 depicts the hypochlorite resistance of a mold prepared from yet another comparative polyamide.

The suitability of the (non-filled) copolyamides (A) in accordance with the invention is shown particularly well on the observation of the clarity that occurs on a longer contact with a solution containing hypochlorite. On a use of the copolyamide (A) in accordance with the invention, it was shown that they also have a clear appearance on a longer contact with a solution containing hypochlorite and do not become opaque as is the case in comparison examples. This is impressively shown for the mold manufactured from a molding compound used in accordance with the invention in FIG. 1 that is still transparent after 6720 hours storage in a solution containing hypochlorite (see FIG. 1), while all the molds of the comparison examples already become opaque after 1344 or 2688 hours (see FIG. 2-4).

As soon as the copolyamide molding compounds are filled—for example with glass fibers—the molding compounds are generally opaque. Other problems occur here due to the fillers that are present in addition to the lack of weight stability. Glass fibers are in particular added to such systems to improve the mechanical properties, in particular to improve the tear force. However, such copolyamide molding compounds show a considerable deterioration of the stability of the tear force on contact with solutions containing hypochlorite (see Table 3, comparison examples 6 and 7). This problem can surprisingly be solved in that the copolyamide A of such a molding compound is used as the basis. A considerably better maintenance of the tear force is found (Example 5, Table 3).

The invention claimed is:

1. A method of manufacturing a mold that is resistant to an aqueous solution containing hypochlorous acid and/or its salt,
the method comprising molding a copolyamide molding compound comprising at least one amorphous or microcrystalline copolyamide (A) that contains the following monomers:
(a) at least one cycloaliphatic diamine;
(b) 0.25 to 3.0 mol % of at least one dimer fatty acid;
(c) 12 to 49.75 mol % of at least one aromatic dicarboxylic acid selected from the group comprising isophthalic acid, terephthalic acid, and naphthalenedicarboxylic acid; and
(d) 0 to 37.75 mol % of at least one aliphatic dicarboxylic acid;

wherein the molar portion of isophthalic acid is at least equal to the molar portion of terephthalic acid; and wherein the monomers (b), (c), and optionally (d) add up to 50 mol % and the molar portions of all monomers contained in the copolyamide (A) add up to 100 mol %;

wherein the mold is selected from the group consisting of components in swimming baths, whirlpools, heating systems, or in sauna or toilet, mixers, faucets, filter housings, water meters, water meter components, valves, valve components, distributors, cartridges, pumps, pump components inspection glasses, lines, and combinations thereof.

2. The method according to claim 1, wherein the at least one amorphous or microcrystalline copolyamide (A) contains the following monomers having the following mol portions:
40 to 50 mol % cycloaliphatic diamine (a),
1 to 3.0 mol % dimer fatty acid (b), and
14 to 44 mol % aromatic dicarboxylic acid (c), and optionally
5 to 35 mol % aliphatic dicarboxylic acid (d),
wherein the portions of all the monomers contained in the copolyamide (A) add up to 100 mol %.

3. The method according to claim 2, wherein the at least one amorphous or microcrystalline copolyamide (A) contains isophthalic acid as an aromatic dicarboxylic acid (c), optionally in combination with terephthalic acid, wherein:
the portion of isophthalic acid related to the sum of all the monomers in the copolyamide (A) amounts to 6 to 49.75 mol %, and/or
the portion of terephthalic acid related to the sum of all the monomers in the copolyamide (A) amounts to 0 to 24.875 mol %.

4. The method according to claim 1, wherein the at least one amorphous or microcrystalline copolyamide (A) has
a light transmission measured according to ASTM D 1003-13 (2013) at a plate produced thereof having a thickness of 2 mm of at least 80%.

5. The method according to claim 1, wherein the at least one amorphous or microcrystalline copolyamide (A) contains at least the following monomers:
(a) at least one cycloaliphatic diamine component selected from the group consisting of bis(4-amino-3-methylcyclohexyl) methane, bis-(4-aminocyclohexyl) methane, bis-(4-amino-3-ethylcyclohexyl) methane, bis-(4-amino-3,5-dimethylcyclohexyl) methane, 2,6-norbornane diamine or 2,6-bis-(aminomethyl)-norbornane, 1,3-diaminocyclohexane, 1,4-diaminocyclohexanediamine, isophorone diamine, 1,3-bis-(aminomethyl)cyclohexane, 1,4-bis-(aminomethyl)cyclohexane, and 2,2-(4,4'-diamonodicyclohexyl)propane;
(b) at least one dimer fatty acid selected from the group consisting of dimer fatty acids having 36 or 44 C atoms;
(c) at least one aromatic dicarboxylic acid selected from the group consisting of isophthalic acid and terephthalic acid; and optionally
(d) at least one aliphatic dicarboxylic acid selected from the group consisting of 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,18-octadecanedioic acid, 1,3-cyclohexanedicarboxylic acid, and 1,4-cyclohexanedicarboxylic acid.

6. The method according to claim 1, wherein the at least one amorphous or microcrystalline copolyamide (A) contains at least the following monomers:
(a) at least one cycloaliphatic diamine component selected from the group consisting of bis-(4-amino-3-methylcyclohexyl)-methane, bis-(4-amino-cyclohexyl)-methane, and bis-(4-amino-3,5-dimethyl-cyclohexyl)-methane;
(b) at least one dimer fatty acid having 36 C atoms; and
(c) isophthalic acid and terephthalic acid; and optionally
(d) at least one aliphatic dicarboxylic acid selected from the group consisting of 1,12-dodecanedioic acid; 1,14-tetradecanedioic acid; and 1,18-octadecanedioic acid.

7. The method according to claim 1, wherein the at least one amorphous or microcrystalline copolyamide (A) contains at least one aliphatic dicarboxylic acid having 6 to 22 carbon atoms as a further monomer (d).

8. The method according to claim 1, wherein the at least one amorphous or microcrystalline copolyamide (A) is selected from the group consisting of MACMI/MACM12/MACM36, MACMI/MACM14/MACM36, MACMI/MACM9/MACM36, MACMI/MACMCHD/MACM36, MACMI/MACM11/MACM36, MACMI/MACM13/MACM36, MACMI/MACM18/MACM36, MACMI/MACMT/MACM36, MACMI/MACM36, MACMI/MACMT/MACM12/MACM36, MACMI/MACMT/MACM14/MACM36, MACMI/MACMT/MACM18/MACM36, MACMI/MACMT/MACM9/MACM36, MACMI/MACMT/MACMCHD/MACM36, and MACMI/MACMT/MACM12/MACMCHD/MACM36,
wherein MACM can wholly or partially be replaced with TMACM; and/or
wherein the dimer fatty acid having 36 carbon atoms can be wholly or partially replaced with a dimer fatty acid having 44 carbon atoms.

9. The method according to claim 1, wherein the at least one amorphous or microcrystalline copolyamide (A) is selected from the group consisting of MACMI/MACM12/MACM36, MACMI/MACM14/MACM36, MACMI/MACM18/MACM36, MACMI/MACMT/MACM36, MACMI/MACM36, MACMI/MACMT/MACM12/MACM36, MACMI/MACMT/MACM14/MACM36, and MACMI/MACMT/MACM18/MACM36,
wherein MACM can wholly or partially be replaced with TMACM; and/or
wherein the dimer fatty acid having 36 carbon atoms can be wholly or partially replaced with a dimer fatty acid having 44 carbon atoms.

10. The method according to claim 1, wherein the at least one amorphous or microcrystalline copolyamide (A) is selected from the group consisting of MACMI/MACM12/MACM36, MACMI/MACM14/MACM36, MACMI/MACMT/MACM36, MACMI/MACM36, MACMI/MACMT/MACM12/MACM36, MACMI/MACMT/MACM14/MACM36 MACMI/MACM12/MACM36, MACMI/MACM14/MACM36, MACMI/MACMT/MACM36, MACMI/MACM36, MACMI/MACMT/MACM12/MACM36, and MACMI/MACMT/MACM14/MACM36.

11. The method according to claim 1, wherein the copolyamide molding compound contains at least one amorphous or microcrystalline copolyamide (A) and optionally at least one inorganic filler (B) and/or optionally at least one additive (C), and/or optionally at least one further polymer (D) that is different from the copolyamide (A) and from the additive (C).

12. The method according to claim 1, wherein the copolymer molding compound has the following composition:
46 to 100 wt %, amorphous or microcrystalline copolyamide (A); and 0 to 50 wt % filler (B); and
0 to 4 wt % additive (C),
wherein components (A) to (C) add up to 100 wt %.

13. The method according to claim 1, wherein the copolyamide molding compound does not contain any further polyamide and/or copolyamide.

14. The method according to claim 1, wherein the copolymer molding compound has the following composition:
96 to 100 wt % amorphous or microcrystalline copolyamide (A); and
0 to 4 wt % additive (C),
wherein the components (A) to (C) add up to 100 wt %.

15. The method according to claim 1, wherein the at least one amorphous or microcrystalline copolyamide (A) contains the following monomers having the following mol portions:
48 to 50 mol % cycloaliphatic diamine (a), and
1.5 to 3.0 mol % dimer fatty acid (b), and
23 to 38.5 mol % aromatic dicarboxylic acid (c), and optionally
10 to 25.5 mol % aliphatic dicarboxylic acid (d),
where the portions of all monomers contained in the copolyamide (A) add up to 100 mol %.

16. The method according to claim 1, wherein the at least one amorphous or microcrystalline copolyamide (A) has
a glass transition temperature measured according to ISO 11537-2 (2013) of at least 170° C.; and/or
a light transmission measured according to ASTM D 1003-13 (2013) at a plate produced thereof having a thickness of 2 mm of at least 85%.

17. The method according to claim 1, wherein the copolymer molding compound has the following composition:
57 to 99.99 wt % of amorphous or microcrystalline copolyamide (A);
0 to 40 wt % of filler (B); and
0.01 to 3 wt. % additive (C),
where components (A) to (C) add up to 100 wt %.

* * * * *